Oct. 6, 1959  D. D. DUESENBERG  2,907,615
PISTON RINGS
Filed June 13, 1958
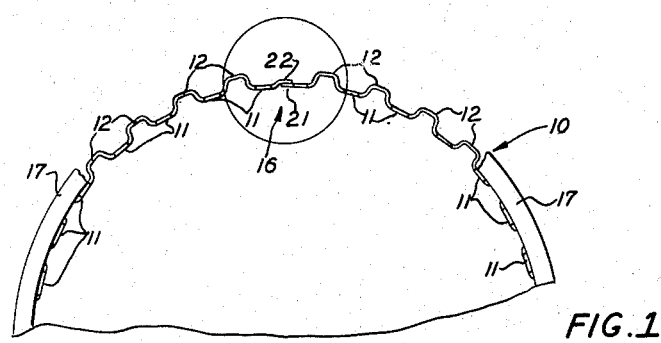
FIG. 1
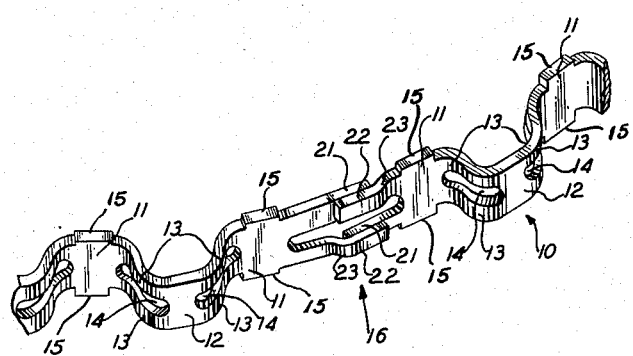
FIG. 2
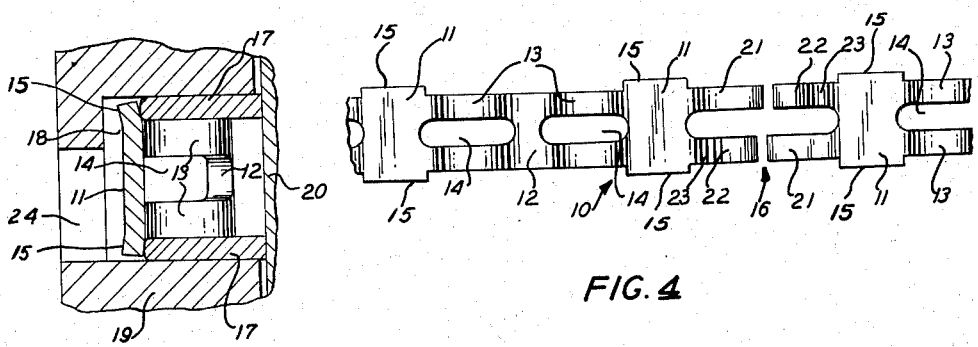
FIG. 3
FIG. 4
D.D. DUESENBERG
INVENTOR.
BY  E. C. McRae
    J. R. Faulkner
    J. H. Oster
ATTORNEYS text continues …

2,907,615

PISTON RINGS

Denny D. Duesenberg, Dearborn, Mich., assignor to Ford Motor Company, Dearborn, Mich., a corporation of Michigan Application June 13, 1958, Serial No. 741,797

3 Claims. (Cl. 309—45)

This invention relates generally to the piston ring art and more particularly to an improved latch used on expanders which comprise a portion of the oil ring assembly of the piston.

Heretofore, many of the oil ring expanders used in internal combustion engines were of a design in which the terminal ends of the expander were in abutting relationship after the expander had been installed in the oil ring groove of the piston in back of the oil sealing rings. The expanders are used to hold the sealing rings in a predetermined compressive outward engagement with the associated walls of an internal combustion engine cylinder bore for oil control purposes. If the sealing rings are not held in proper engagement with the walls of the cylinder, the loss of the oil control will result and either an excessive oil consumption will take place when the engagement is too loose or excessive pressure is maintained by the oil ring against the cylinder wall resulting in excessive friction and ultimate scoring of the cylinder walls.

The art is replete with examples of the abutting end type of expanders. For the purpose of illustration, an expander ring of the type disclosed in United States Letters Patent No. 2,789,872, issued to H. M. Olson on April 23, 1957, has been selected.

In the construction of many of the prior art devices the terminal ends of the expander are in abutting relationship after assembly upon the piston. These terminal ends, however, are capable in many instances of being overlapped. Because of the space between the expander and the bottom of the oil ring groove, overlapping of the terminal ends is possible. The result of this overlapping is that the expander diameter is decreased, therefore, an insufficient outward force is exerted by the oil ring against the cylinder wall resulting in excessive oil consumption. This excessive oil consumption causes fouled spark plugs, blue exhaut smoke, loss of power, etc.

In the applicant's construction an interlocking latch is employed in which the terminal ends of the expander are interengaged thus preventing the expander from popping out after it has been assembled in the oil ring groove. The force holding the two ends in engagement is derived by undercoiling the spring to a smaller diameter than its assembled diameter. The latch means employed extends a sufficient distance which distance is greater than the undulations generally found in such rings, thereby preventing an overlap of the expander terminal ends.

It is an object of this invention, therefore, to provide a latch for an oil ring expander which maintains the expander ring in the properly assembled position.

Another object of this invention is to provide a latch for an expander used in connection with an oil ring in which the expander latch prevents overlapping of the terminal ends of the expander.

Still a further object is to provide an expander having improved latch means of a positive interlocking design, such latch means being simple in configuration and construction, being capable of mass production, involving a minimum of cost, and being capable of easy assembly in the oil ring groove of the piston.

Other objects and advantages of this construction will be made more apparent when considered in connection with the accompanying drawings, wherein:

Figure 1 is a fragmentary plan view partly cut away of an expander having associated therewith the thin rails which may be used to complete a piston oil ring combination and showing the expander in the fully assembled position.

Figure 2 is an enlarged fragmentary perspective view of the section of the expander shown in the circle of Figure 1.

Figure 3 is a fragmentary enlarged vertical section through a piston and associated cylinder and showing the expander and rails as installed in the oil groove ring of the piston.

Figure 4 is an enlarged fragmentary plan view of the latch portion of the expander in the unassembled open position.

Referring now to the drawings, and in particular Figures 1 and 2, an expander of the type which may embody the applicant's invention is generally indicated at 10. This expander is generally circular in outline and is parted at one side. For the purpose of illustrating the applicant's invention, the expander 10 is basically the design disclosed in the Olson patent mentioned previously barring one vital exception which is the novel latch means employed by the applicant. The expander 10 consists of a series of alternate inward and outward corrugations. The inner corrugations have inner crowns 11 and the outer corrugations have outer crowns 12 which are connected by upper and lower connecting legs 13 separated by slots 14. From each of the inner crowns 11 a short lip or pad 15 extends at both upper and lower edges. Pads 15 extend both upwardly above and downwardly below the edges of the spacer expander respectively and are of narrow width. The latch construction of the expander is indicated generally at 16.

To complete the oil ring assembly, the expander uses a pair of separate thin rails 17 which are more clearly shown in Figure 3 in the assembled position. The inner portion of the end rail 17 contacts the pads 15 and the outer portion extends out of the oil groove 18 in the piston 19 to contact the walls 20 of the cylinder. Oil groove 18 has an opening 24 from the bottom of the groove to the interior of the piston for drawing off the oil picked up by the rails 17.

Looking more specifically now at the latch construction shown at 16, which can be seen more clearly in Figures 2 and 4, the applicant has provided a pair of spaced apart extensions 21 and 22 at each of the terminal ends of the expander. Extensions 21 extend circumferentially outwardly on substantially the same radius as the inner crowns 11. Extension 22, however, is outwardly bent at 23 and extends circumferentially on a different radius to allow the extensions 22 to overlie the extensions 21 in a sliding type of engagement. It is to be noted that the length of the extensions 21 and 22 is greater than the space between the crowns 11 and 12 thus precluding the possibility of overlapping the terminal ends of the expander when assembling the expander in the oil ring groove of the piston. Once the extensions 21 and 22 of the respective terminal ends of the expander are slidably interlocked as shown in Figures 1 and 2, pop-out and overlapping is effectively prevented and when the thin rails 17 are assembled in the oil ring groove, a predetermined outward forcing of the rails against the cylinder walls will be automatically obtained. The outwardly bent section 23 also effectively limits the extent to which the extensions may interlock thus maintaining a predetermined expander diameter. It can be seen, therefore, that the latch although simple in configuration and assembly is effective in maintaining the necessary expander diameter which insures the precise contact necessary between the oil rings and the cylinder walls.

It is to be understood that this latch may be utilized in any expander in which the compressive force is outwardly against sealing ring members which engage the cylinder walls of an internal combustion engine. Therefore, this invention is not to be limited to the exact construction shown and described, but that various changes and modifications may be made without departing from the spirit and scope of the invention as defined in the appended claims.

What is claimed is:

1. An oil ring construction for use in the oil ring groove of a piston, comprising oil ring means, an expander having terminal end portions, said expander arranged to be mounted within said ring means to resist the inward movement of said ring means when said expander and ring means are assembled in an oil ring groove of a piston, longitudinally extending extensions projecting from each of said terminal end portions in opposed alignment, at least one of the extensions from each terminal end portion being formed to overlie the opposite extension from the other terminal end portion.

2. An expander latch comprising an expander having a generally circular configuration and having adjacent first and second terminal end portions, a plurality of spaced apart parallel extensions projecting from each of said first and second terminal end portions, said extensions on said first and second terminal ends portions being aligned oppositely to each other, at least one of the extensions on the first terminal end portion overlying one of the extensions opposite to it on the second terminal end portion, and at least one of the extensions on said second terminal end portion overlying one of the extensions opposite to it on the first terminal end portion.

3. In an oil ring assembly, a split expander having a plurality of corrugations for imparting a compressive outward force against a pair of oil rings when the oil rings are mounted upon said expander having a pair of extensions on each side of the expander split extending longitudinally of the expander in different radial planes, said extensions being formed so that the extensions on one side of the split overlie and underlie respectively the extensions on the other side of the split, said extensions extending longitudinally outwardly a distance greater than the spacing between the corrugations.

References Cited in the file of this patent

UNITED STATES PATENTS

| | | |
|---|---|---|
| 1,062,095 | Hamel | May 20, 1913 |
| 1,181,618 | Smith | May 2, 1916 |
| 2,680,045 | Hamm | June 1, 1954 |